(12) United States Patent
Giovannini et al.

(10) Patent No.: US 11,379,733 B2
(45) Date of Patent: Jul. 5, 2022

(54) DETECTING AND PREDICTING OBJECT EVENTS FROM IMAGES

(71) Applicant: International Business Machines Corporation, Armonk, NY (US)

(72) Inventors: Andrea Giovannini, Zurich (CH); Frederik Frank Flöther, Schlieren (CH); Florian Graf, Niederhasli (CH); Stefan Ravizza, Wallisellen (CH); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/507,094

(22) Filed: Jul. 10, 2019

(65) Prior Publication Data

US 2021/0012216 A1   Jan. 14, 2021

(51) Int. Cl.
| | |
|---|---|
| *G06N 5/02* | (2006.01) |
| *G06F 16/901* | (2019.01) |
| *G06N 5/04* | (2006.01) |
| *G06V 10/426* | (2022.01) |
| *G06V 10/70* | (2022.01) |

(52) U.S. Cl.
CPC ........... *G06N 5/02* (2013.01); *G06F 16/9024* (2019.01); *G06N 5/047* (2013.01); *G06V 10/426* (2022.01); *G06V 10/768* (2022.01)

(58) Field of Classification Search
CPC .............................. G06F 16/9024; G06N 5/022
See application file for complete search history.

(56) References Cited

U.S. PATENT DOCUMENTS

| | | | |
|---|---|---|---|
| 8,589,315 | B2 | 11/2013 | Medasani et al. |
| 9,311,568 | B1 | 4/2016 | Feller et al. |
| 9,672,496 | B2 | 6/2017 | Mitchell et al. |
| 10,068,024 | B2 | 9/2018 | Sawhney et al. |
| 2012/0158633 | A1 | 6/2012 | Eder |
| 2016/0055409 | A1 | 2/2016 | Majumdar et al. |
| 2016/0357870 | A1 | 12/2016 | Hentschel et al. |
| 2017/0076206 | A1* | 3/2017 | Lastras-Montano ........................ G06F 16/9024 |
| 2017/0154108 | A1* | 6/2017 | Kraus ................. G06F 16/3346 |
| 2018/0350144 | A1 | 12/2018 | Rathod |

(Continued)

FOREIGN PATENT DOCUMENTS

| | | |
|---|---|---|
| CN | 106156365 A | 11/2016 |
| WO | 2018132143 A1 | 7/2018 |
| WO | WO-2020263228 A1 * | 12/2020 ............. G06Q 50/01 |

OTHER PUBLICATIONS https://web.stanford.edu/~vinayc/kg/notes/What_is_a_Knowledge_Graph.html (Year: 2021).*

(Continued)

*Primary Examiner* — Ross Varndell
(74) *Attorney, Agent, or Firm* — Scott Dobson

(57) ABSTRACT

A method for event predictions is provided. The method includes receiving input data. The method further includes identifying an object in the input data with the identified object associated with a first node in a knowledge graph. The method further includes determining a second node of a first object event with the second node related to the first node in the knowledge graph. The method further includes contextualizing the identified input object with the first object event.

12 Claims, 5 Drawing Sheets

(56) References Cited

U.S. PATENT DOCUMENTS

2019/0080245 A1\* 3/2019 Hickman ............. G06K 9/6296

OTHER PUBLICATIONS

Esteban et al., "Predicting the Co-Evolution of Event and Knowledge Graphs," 19th International Conference on Information Fusion, Heidelberg, Germany, Jul. 5-8, 2016 (Year: 2016).\*
A. Bauer and Y. Fischer, "Object-event graph matching for complex activity recognition," 2011 IEEE International Multi-Disciplinary Conference on Cognitive Methods in Situation Awareness and Decision Support (CogSIMA), 2011, pp. 88-93, doi: 10.1109/COGSIMA.2011.5753759. (Year: 2011).\*
Wang et al., "Transferring Deep Object and Scene Representations for Event Recognition in Still Images", Int J Comput Vis (2018), https://doi.org/10.1007/s11263-017-1043-5, 20 pages, Published online: Sep. 13, 2017, © Springer Science+Business Media, LLC 2017.

\* cited by examiner

DETECTING AND PREDICTING OBJECT EVENTS FROM IMAGES

BACKGROUND

Today's digitization industry effort reveals more and more autonomous systems. Each of them may be equipped with a plurality of sensors, some of them may only have a still image camera. Well-known recognition techniques may be used to identify one or more objects of a captured image. However, in order to enable an orientation in a real-world environment the autonomous systems, like a production robot, a service robot in the healthcare industry, or a shop floor vehicle, would need to be enabled to identify and recognize not only an object in an image but also capture a context between identified objects in the image and have a basic interpretation of what is happening between the objects, i.e., associated attributes of the identified objects and a "guess" what has happened or what will happen. Such techniques may go far beyond traditional detection or classification of images with neural networks or other machine-learning techniques.

SUMMARY

According to an embodiments of the present disclosure a method for event is provided. The method includes receiving input data. The method further includes identifying an object in the input data with the identified object associated with a first node in a knowledge graph. The method further includes determining a second node of a first object event with the second node related to the first node in the knowledge graph. The method further includes contextualizing the identified input object with the first object event. Further provided are a system and a computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
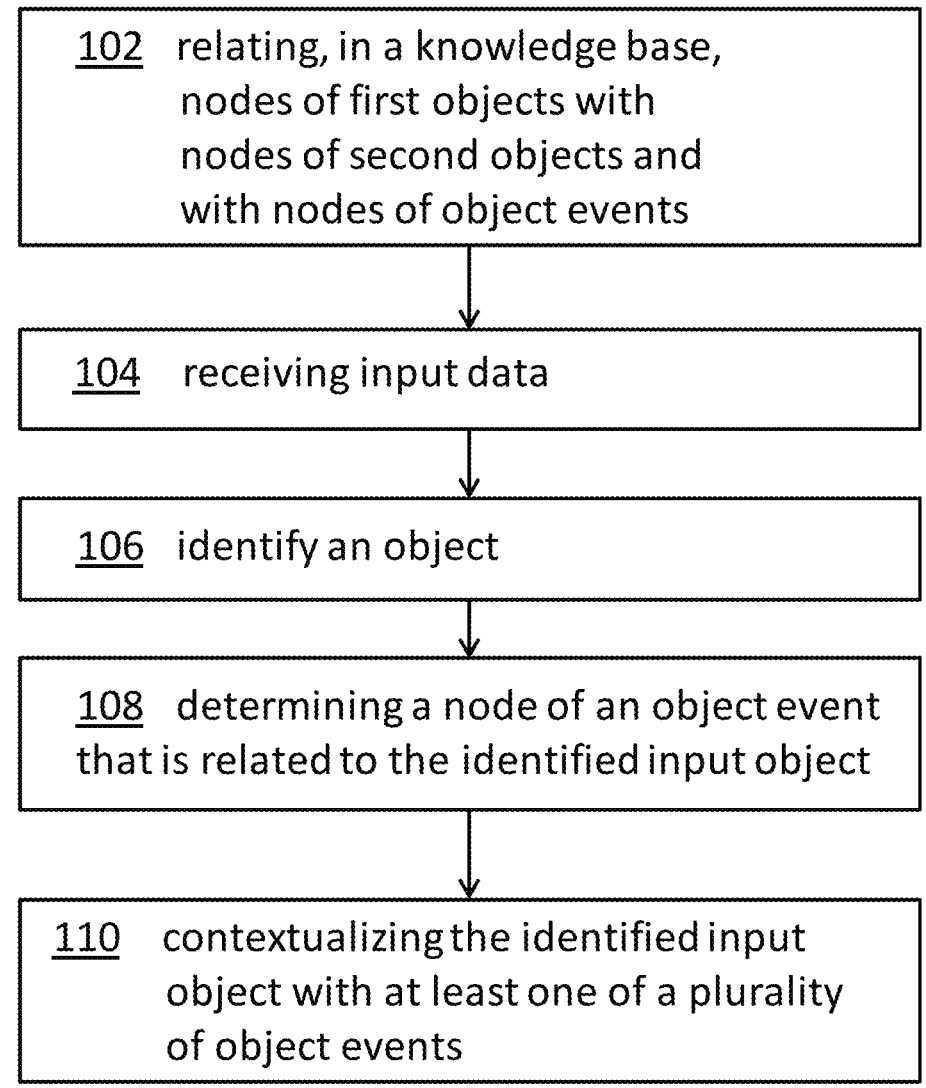
FIG. 1 shows a block diagram of an embodiment of a method for event predictions based on objects in received data.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the context of this description, the following conventions, terms and/or expressions may be used:

The term 'event prediction' may denote the process of determining a certain activity that would happen in the future based on received input data, in particular, a captured still image. In addition, the event prediction may here also relate to a determination—with a certain probability—of what has happened before the captured still image was taken.

The term 'received data' may denote the input data in which the objects may be recognized in the sense of detection or classification. The received data may be used as synonym for input data.

The term 'knowledge graph' may denote a technology, system and/or tool to store structured, semi-structured and unstructured information used by one or more computer systems. The information and data may be stored as facts in nodes of the knowledge graph which may be connected, i.e., linked by so-called edges which may have different weights. The weights may be adapted over time depending from outside influence. The knowledge graph may also grow over time by adding additional nodes with additional facts. The proposed concept may rely on a knowledge graph with a plurality of abstraction levels. Each level may be instrumental for storing nodes of a certain category. E.g., the most basic layer may be reserved for nodes relating to objects to be recognized. The next higher layers in the layer hierarchy may relate to more and more abstract objects relating to the base object. Additionally, at least one layer may be reserved for events relating to the objects and/or their related abstractions.

The term 'nodes' may denote a storage node for a fact in a knowledge graph. The nodes may be linked by knowledge graph edges carrying predetermined or dynamically adaptable weights.

The term 'first object' may denote one of the identified, determined or recognized objects. Different objects—in particular, a second object—may be determinable in a captured image or other input data.

The term 'nodes of an object event' may denote a regular storage node for a fact in the knowledge graph, wherein the event may be an event related to any abstraction layer of an object. Additionally, an object event may also be related—via an edge from one node to another node—to another event. Also, the events may be stored in different levels, i.e., different abstracted forms.

The term 'contextualizing' may denote the activity of relating an identified or recognized object to another identified or recognized object in a captured image (or other types of input data). Additionally, the term may denote the activity of relating identified or recognized objects in a captured image to an event by traversing a knowledge graph. In particular, the relationship between an object and an event may have a high probability for a specified time vicinity of the time the image was captured. The time vicinity may be directed to the past and/or to the future of the captured time. In other words, contextualizing may relate two objects with an event—i.e., an activity pertaining to both recognized objects.

The proposed method for event predictions based on objects in received data may offer multiple advantages and technical effects:

Image recognition systems may be significantly enhanced in that it is not only possible to recognize specific patterns, like objects, in input data, like a captured image, but the image recognition systems may also have the capability of event prediction, i.e., give the image a certain interpretation in time. "In time" may denote a particular time vicinity of the image captured. For humans this is, most of the time, an easy task. The ease is based on the profound experience of real-life situations.

In order to transpose such capabilities to a machine environment, it may be required to link certain recognized objects in an image to a specifically structured knowledge graph comprising different levels of abstraction from base objects and link to the base objects and the abstractions certain possible events and other attributes. This way, it may become possible to perform a higher level interpretation of a captured scene by relating certain recognized objects in a time sequence.

Different probability approaches may be used to filter out the most probable event before and/or after the time the picture has been taken. It may also be required to adapt the duration of the time vicinity depending on the type of event that is going to happen.

However, such a sophisticated approach may enable autonomous machines like robots and self-driving cars or shop-floor transport vehicles in a warehouse or a manufacturing site to move more considerately, and potentially foresee accidents so that they may be avoided.

Robotic arms and hands may also be enabled to anticipate events that may happen in the very near future and prepare themselves—in particular, its actuators by, e.g., pre-positioning—for expected situations. This event prediction may be instrumental for a better human/machine interaction.

In the following, additional embodiments—applicable to the method as well as to the related system and computer program product—will be described:

According to some embodiments of the method, the contextualizing may comprise ranking object events by a number of relations between the identified object and the object events. That may either be direct or indirect links or edges. And they may potentially weighting factors so that the context to be determined may be influenced by setup parameters of the knowledge graph used.

According to some embodiments, the method may also comprise triggering an action signal for an actuator based on the contextualization. For example, an action signal for an actuator may be triggered based on the highest ranked object event. Hence, the actuator may control a gripper—i.e., a robotic hand—and enable it to, e.g., catch a falling item or, to escape from route a human is taking. This may also be summarized as another useful embodiment of the method, in which the actuator may be influencing a movement of a portion of a robot or the whole robotic unit. However, this may apply to any machinery with parts that may be actively moved. The robotic unit may comprise elements configured to perform all or some aspects of the disclosed method. For example, the robotic unit may include elements of system 500 of FIG. 5 and/or system 600 of FIG. 6 to perform method 100 of FIG. 1. In some embodiments, method 100 of FIG. 1 may be performed by a separate computing system and the separate computing system may communicate a signal to the robotic unit, over one or more networks, that influences movement of the robot.

According to some embodiments of the method, a time vicinity value—in particular, the length of time—of the time vicinity may be a function of—i.e., be depending on—a related object event. For example, it may be imagined that a time vicinity value in which a prediction should be made regarding a falling or thrown ball may be different to a movement prediction of a snail or other slow-moving element. A similar difference may be made between a 100 m runner just before crossing the finish line and a pair of dancers performing a slow waltz.

According to some embodiments of the method, the input data may be selected out of a group comprising image data, sound data, and temperature data. This may represent a small exemplary group of possible input data sources. However, they may represent examples of high technical value. It may also be possible to relate a sequence of images—e.g., from a video camera in contrast to a still image camera—to a specific context during the contextualizing step of the method due to a relationship derivable from the knowledge graph of images having a short time interval between them. This may be expressed according to another embodiment of the method in which the input data may be a sequence of data—i.e., a sequence of images—and wherein the contextualizing of the at least one of the input objects may be based on a correlation of objects in different elements of the sequence of input data. i.e., correlating different images, e.g. in a time series manner.

According to some embodiments of the method, the object identification may be performed by pattern detection or classification, i.e., image detection or image classification. The machine-learning techniques may especially be suited for "context understanding" of the input data in the form of image object segmenters and/or deep neural networks or other forms of classifiers. It may again be noted that the proposed concept herein may be best utilized for the case of images; however, the techniques proposed may also work with other kinds of input data.

According to some embodiments of the method, the levels may be differentiated by their respective value of conceptual abstraction. Thus, different context levels may be differentiated using a special setup of the knowledge graph. The different hierarchical levels, the weighing factors, and the established links between levels (or layers) and between nodes inside a layer may allow a fine-grained tuning of the behavior of the method and/or the related prediction system.

According to some embodiments, the method may also comprise loading the knowledge graph with content from an electronic game comprising relationship definitions between objects and/or object events. This may recycle work already done by other developer groups. Because computer games become more advanced and closer to reality, these games also need knowledge graphs that may be enabled to have context information for the avatars and items used and manipulated as part of the game. Thus, using such a knowledge graph as starting point for the here proposed concept may reduce initial setup efforts.

In the following, a detailed description of the figures will be given. All instructions in the figures are schematic. Firstly, a block diagram of an embodiment of a method for event predictions based on objects in received data is given. Afterwards, further embodiments, as well as embodiments of the system for event predictions based on objects in received data, will be described.

FIG. 1 shows a block diagram of an embodiment of a computer-implemented method 100 for event predictions based on objects in received data. The input data relating to the objects to be correlated may have different sources, like data of an image, a sound file, or other IoT (Internet of Things) sensors. However, for the purpose of comprehensibility an image will be used as a guiding concept for the following figure description.

The method comprises relating, 102, in a knowledge graph, nodes of first objects with nodes of second objects and with nodes of object events. Thereby, the knowledge graph is structured into multiple hierarchical levels. At least two levels may be used: one for physical objects and another one for events that may have a relations ship to the events, i.e., an edge to an object in the terminology of a knowledge graph. At least one such level comprises nodes for objects, and at least one such level comprises nodes for object events.

The method 100 further comprises, receiving input data, 104, (e.g., a captured image) comprising detail data about input objects, and identifying, 106—e.g., by image detection, segmentation or classification—at least one of the input objects in the input data whose related node is comprised in the knowledge graph and which may be put into relationship to a classified object in the image. Typically, two objects may be detected/identified or classified in the image whose relationship may be predicted in the form of an event.

The method 100 further comprises determining, 108, a node of an object event that is related—directly or indirectly (i.e., more than one link or edge)—to the identified input object or a plurality of objects—and contextualizing, 110—in particular, in space and time—the identified input object with at least one of a plurality of object events. Thereby, an event in a time vicinity of a capturing time of the input data (i.e., the image) is predicted.

Current technology of image recognition can determine multiple objects in an image. It is also known that the general attributes can be associated with recognized objects, e.g., using the input in form of a knowledge graph.

However, the proposed concept introduces a second level of semantics which goes beyond the simple task of object recognition. The proposed concept is targeted at identifying one or more events that are most probable to happen soon after the data, i.e., an image, has been captured or, alternatively, what has happened before. However, in order to anticipate future developments—in particular, for autonomous vehicles—the future aspect may be more important.

For this, the proposed method and system may use a well-defined knowledge graph comprising information about objects, possible degrees of freedom of the object and, possible interactions (e.g., events) between objects. These different types of information may be stored as nodes of the knowledge graph on different logical levels of the knowledge graph. For example, the nodes representing objects may be at the lowest level, the degrees and types of freedom (in particular, in terms of movements in space in a scene) may represent a next level and, potentially related events may be represented by nodes in an even higher level of the knowledge graph. Objects, degrees of freedom and events may be linked by edges of the knowledge graph across the levels and within the levels.

The proposed method and system may access and use this extra layer(s) of information of the knowledge graph to associate attributes with an object and make a prediction on what would happen shortly after the image has been captured. This may be explained in the next two figures.

Figure 2:
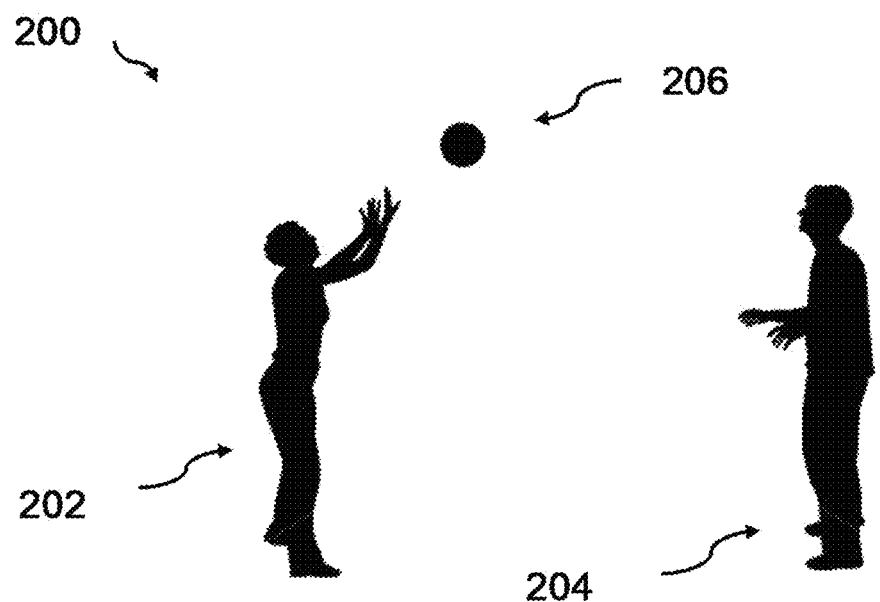
FIG. 2 shows an example image of two players and a ball.

FIG. 2 shows an example image 200 of two players 202, 204 and a ball 206. It may be noted that this representation is already an abstracted representation of a real-life scene which may have many more details. However, recognition techniques exist to abstract the two players 202, 204 and the ball 206 from the rest of the details in the image (not shown).

The recognition techniques may determine that the left player 202 has open hands and that the ball 206 is closer to the hands of left player than those of the right player (more closed hands). This may open up to alternatives: (a) the left player 202 has thrown the ball 206 so that it may follow a paraboloid path, in particular, in the direction of the second player 202; or, (b) the left player 202 will soon catch the ball 206. Thus, a prediction of a future or past situation—in particular, with probability values for either option—in a time vicinity of the captured image may be made.

It may be noted that the interpretation that the persons 202, 204 are denoted as players is derivable from the attributes that the two players face each other, that they are in an alerted position and, that a ball is positioned (most probably flying) between the two people 202, 204.

Figure 3:
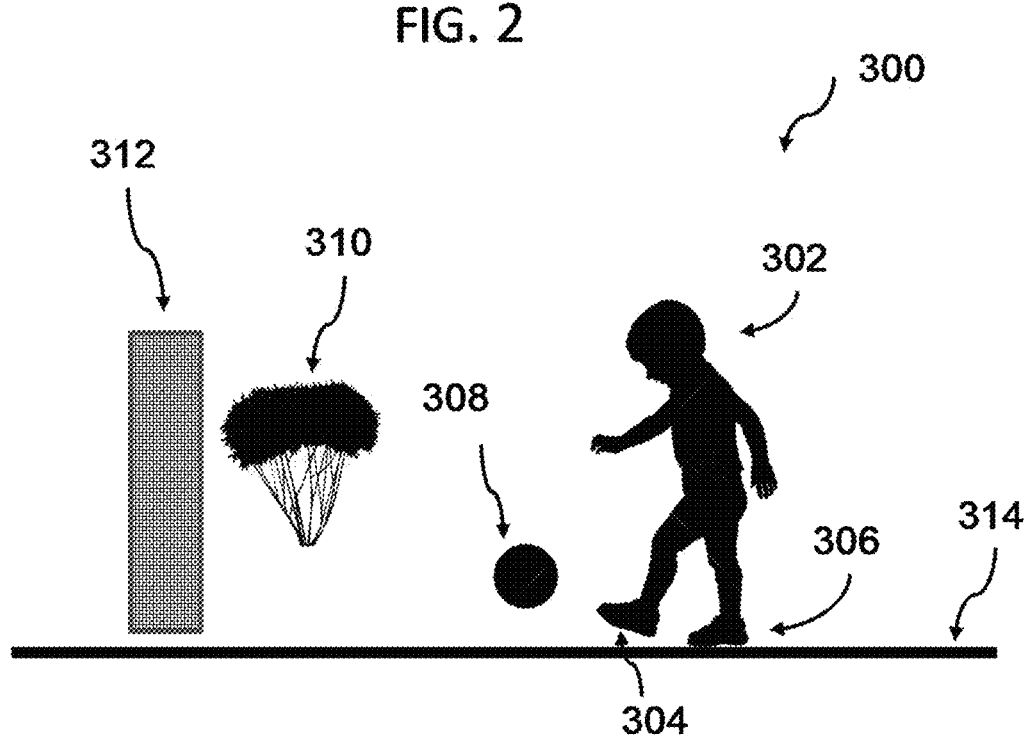
FIG. 3 shows an example image of a child most probably playing with a ball.

FIG. 3 shows an example image 300 of a child 302 most probably playing with a ball 308. The image recognition system may determine that the person 302 is a child because of the relationship of the diameter of the recognized head in comparison to the height of the body from the foot 306, standing on the ground 314, to the head. The image recognition may also determine that the left foot 304 is lifted from the ground 314 and directed towards the ball 308. The recognition system may also recognize a bush 310 and a wall or goal 312. For simplicity reasons, it may be assumed that a wall 312 may have a higher probability. Other details of the captured image are not shown.

Figure 4:
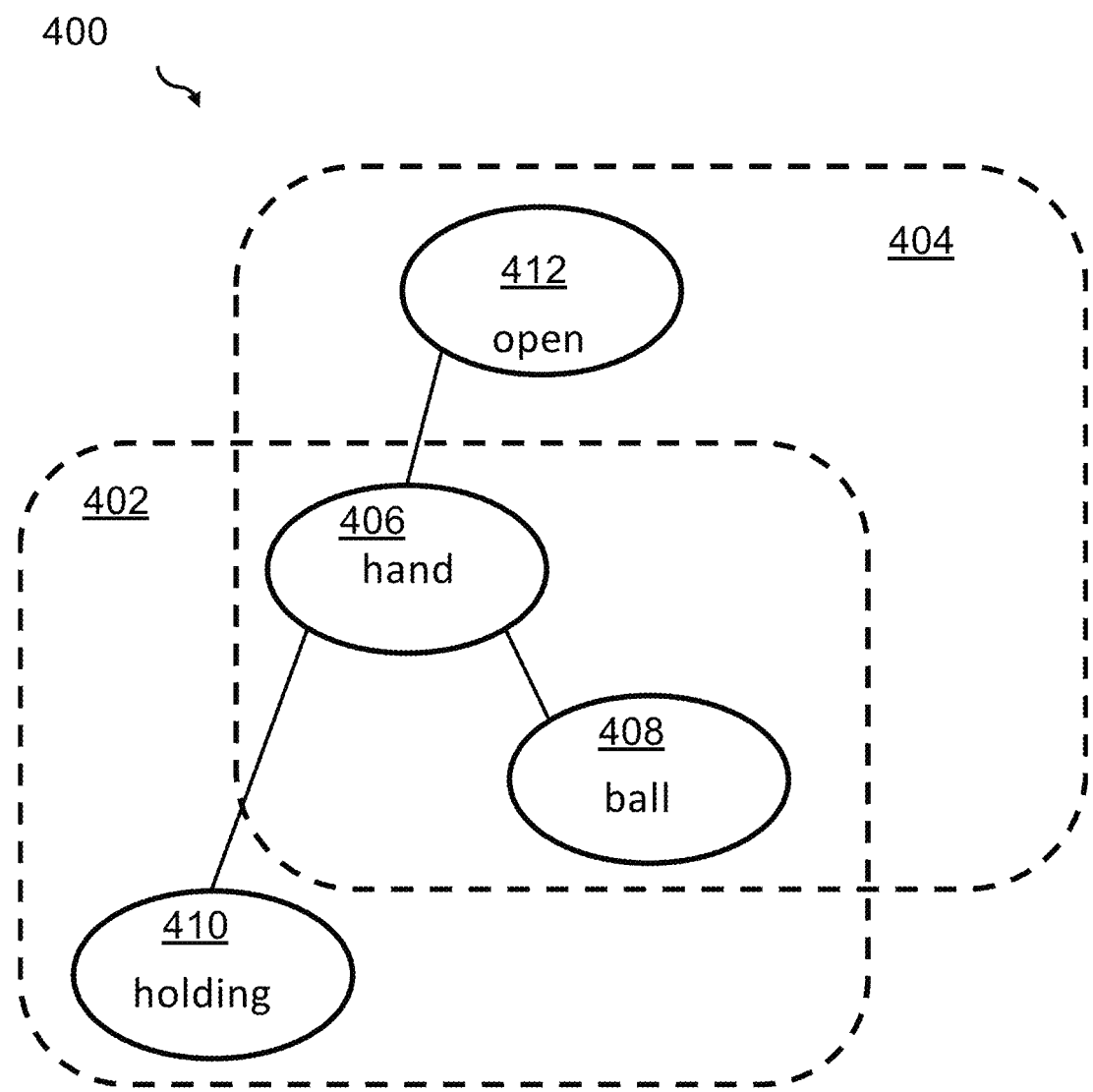
FIG. 4 shows a block diagram of an embodiment of a small portion of a knowledge graph.

FIG. 4 shows a block diagram of an embodiment of a small portion of a knowledge graph 400. This will be used for an interpretation of the captured situation according to FIG. 2. Relating to one level of the knowledge graph, the objects hand(s) 406—in particular, of the left person 202—and the ball 408 are represented by respective nodes of the knowledge graph 400. The additional attributes "open" 412—meaning "open hand(s)"—or "holding" 410—meaning "hands holding something" may also be linked to the object hand 406 in the knowledge graph 400 as events. These attributes may be stored on a higher level of the knowledge graph than the simple objects which may also stay in relationship to the other. This is shown by the line—i.e., "edge" in knowledge graph terminology—between the ellipse 406 for "hand" and the ellipse 408 for "ball".

In the captured image, the person 202 is recognized as well as a ball 206 relatively close to the open hands. The meta-information in the knowledge graph, implemented as higher hierarchy nodes are accessed through node traversals.

The higher hierarchy nodes, after graph traversal, are read and the node "ball descend" is extracted as a result and consequence, represented by reference numeral 404 "ball will fall" (not directly shown).

In addition, other context information can be added in the process depending on the focus of the image classifier and of the use case. In the example, additional information could be the nature of the ground, e.g., concrete or solid, which indicates, consequently, the probable bounce back of the ball. Again, this information can be integrated in the higher hierarchy level.

The proposed example algorithm could be extended with further information about spatial depth or shadows. In addition, some concepts might only be relevant if the objects are close to each other (like the two players).

A similar interpretation may be applied to the scene in FIG. 3. The ball 308, the child 302 and the foot 304 may be interpreted as basic objects. The same may apply to the floor 314, the bush 310 and the wall 312. However, in higher hierarchy nodes of the knowledge graph, attributes of a flight curve of a ball may be stored, as well as the event that a ball may be bounced back from a wall. Other events may be "foot kicks ball", "ball flies", "ball hits wall", "ball falls", "ball falls to the ground", and so on.

Based on a probability determination—based on a number of edges between respective nodes and the knowledge graph and their potential weights—a highest probability value can be determined for the future event "ball is flying". A similar probability may be determined for a past event "ball has been kicked". A lower probability value for a future event may be determined for "ball is hitting the wall" or "ball is hitting the bushes". A person skilled in the art will understand that the underlying knowledge graph is key for the contextualization of a scene captured in an image. Different content in the knowledge graph may result in different event predictions.

The inventive concept can be generalized and extended to abstract the object activity based on the knowledge graph in similarity given by an object detection. In addition, different layers (not only one as in the previous example with "ball will fall" or "ball will stay") would be added to the knowledge graph in order to allow for a generalization. For example, if the term "orange" is in the object recognition layer, "fruit from a tree" and "sphere from orange color" is on the further generalization layer, then "solid object" is on the most generic layer. A node in the most specific or basic layer does not have to be connected through each hierarchical level, but may jump one or more hierarchical levels.

The main steps of an example embodiment may be summarized as follows: (i) the object detection outputs the best matches for a given image of a portion of the image; (ii) the related system uses the weighted knowledge graph and travels across different hierarchical levels from specific to generic for the different matches; (iii) the related system reads from the generic layers the possible events happening in the reality of the captured image between the objects; (iv) the system consolidates the possible results based on the different possible object matches, and if multiple events are possible, the events may be presented in a ranked list of events based on the initial confidence and the sum of the relevant weights stored in the knowledge graph.

Another example of the proposed system for the situation of an orange falling from the tree may be the following:

First, an orange is detected/recognized by itself with sky in the background, and the second possible match is a ball. In the same picture, an orange tree is also detected along with several leaves. Second, the system traverses the knowledge graph and finds, for the orange, a connection in the next knowledge graph layer with "fruit from the tree" and with "sphere with orange color". The following hierarchical level connects "sphere with orange color" with "sphere", and "fruit from a tree with leaves". Similarly, the traversing works for the other possible objects as well.

Third, the system uses the highest hierarchical level which connects "sphere" and "sky in the background" with the event "falling" to conclude/determine that the object "orange" is falling. Similarly, this is also done for the other possible matches. Finally, the system compares the probability results of all the different matches, and in this case, an automatic consolidation happens: both "orange" and "ball" connecting the higher level layer of the knowledge graph with the same note "sphere" leading to the same event detection (if this does not happen, then the graph weights of the edges are consolidated on the event and compared; the highest consolidated weight is the most probably detected event).

In another embodiment, specific object events may be identified—e.g., a foul between two players—using custom-trained events. In this case, the knowledge graph of the system described above (and below) could be tailored to custom nodes and edges, e.g., in the case of soccer nodes and edges that described the foul. The note "foul" would be connected with "contact" or "closeness between two players". Consequently, in the presence of edges with property temporal sequence, a file can be recognized after two players have come sufficiently close (and other potential criteria are met, e.g., when the players approaching each other with high-speed).

The nodes connected with edges with a temporal sequence is an important extension of the proposed concept, as it allows one to verify not only one frame/context, but multiple of them and extract a different insight. In the example, it is possible to determine whether or not a foul has happened (but the ball was played). This extension is particularly interesting to process video sequences in a computationally cheap manner, wherein not all the frames have to be processed together, but only those with certain initial criteria (e.g., closeness between the players) is recognized.

Another aspect of the proposed concept is related to the construction and loading and/or filling of the knowledge graph. In order for the method to leverage the knowledge graph for the proposed algorithms, an initial data set has to be loaded. Some sources for data of the knowledge graph to be constructed may be mentioned:

Publicly available information for leveraging natural language processing to scan for entities (like "ball") and associated events and respective attributes may be considered. Publicly available information could be, but is not limited to, websites, e-books, academic journals and other studies.

For quite some time, electronic games for computers or consults have developed sophisticated engines to simulate real-world experiences. Especially, open word games represent an electronic reproduction of reality. This digital information carrying relevant information for object identification and object action (i.e., event) prediction could be used to enhance the knowledge graph.

Related to the former point, there are open, as well as closed source physical engines. Physical engines are used in games, as well as videos or, other simulations to reflect object events and behaviors. There are two types of physical engines: firstly, the real-time variant for high-speed calculations, and secondly, the high-position variant for very accurate calculations. For some embodiments of the present disclosure, it may be sufficient to use the real-time variant to get approximated information. As an example, the Open Dynamics Engine is able to simulate the reaction of different types of bodies. So, it may contain information that a round ball falls onto the floor. Thus, the required base content for the knowledge graph for some embodiments of the present disclosure may not need to be completely independently developed, but only adapted to specific use cases of the proposed concept.

Figure 5:
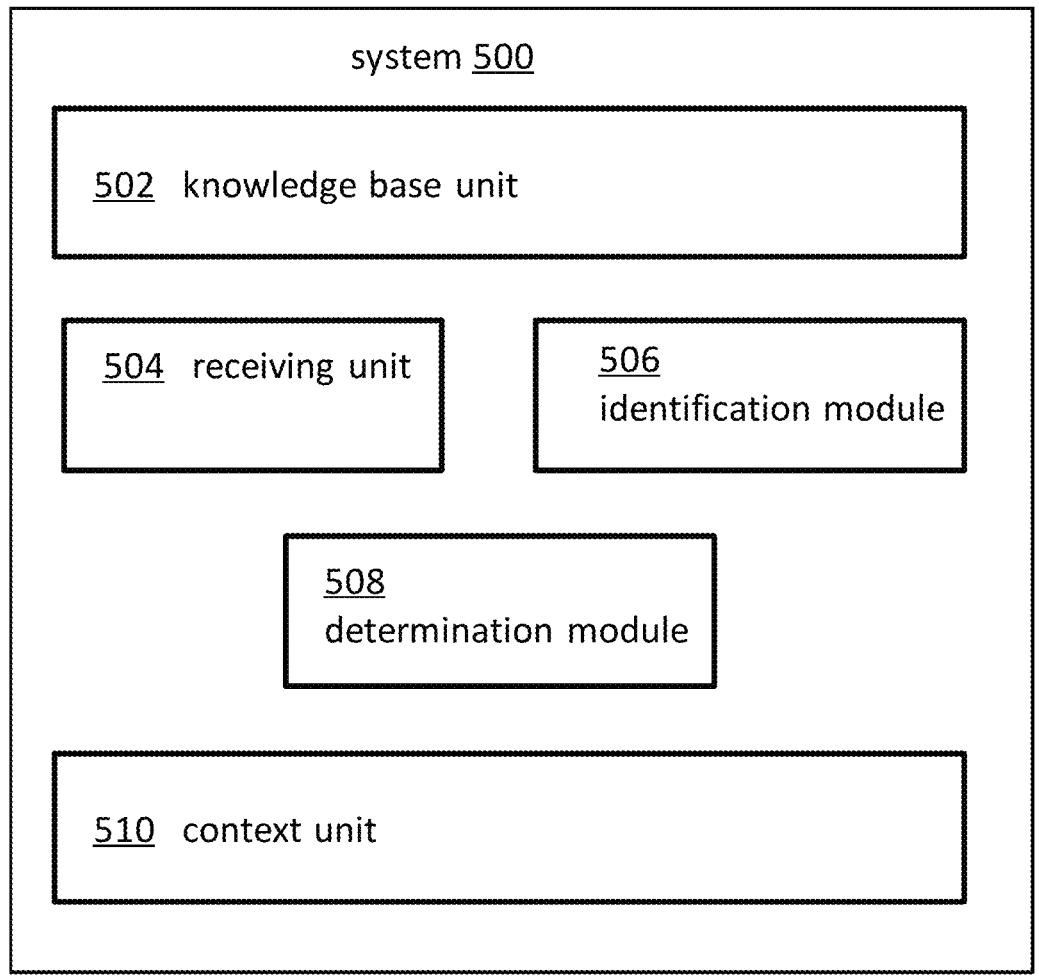
FIG. 5 shows a block diagram of an embodiment of the prediction system for event predictions based on objects in received data.

FIG. 5 shows a block diagram of an example prediction system 500 for event predictions based on objects in received data. The prediction system 500 comprises a knowledge graph unit 502 adapted for relating nodes relating to first objects with nodes of second objects and with nodes pertaining to object events, wherein the knowledge graph unit is structured into multiple hierarchical levels, wherein at least one such level comprising nodes for objects, and at least one such level comprising nodes for object events.

The prediction system 500 also comprises a receiving unit 504 adapted for receiving input data comprising detail data about input objects, an identification module 506 adapted for identifying at least one of the input objects in the input data whose related node is comprised in the knowledge graph, a determination module 508 adapted for determining a node of an object event that is related to the identified input objects, and a context unit 510 adapted for contextualizing the identified input object with one of a plurality of object events, thereby predicting an event in a time vicinity of a capturing time of the input data.

Figure 6:
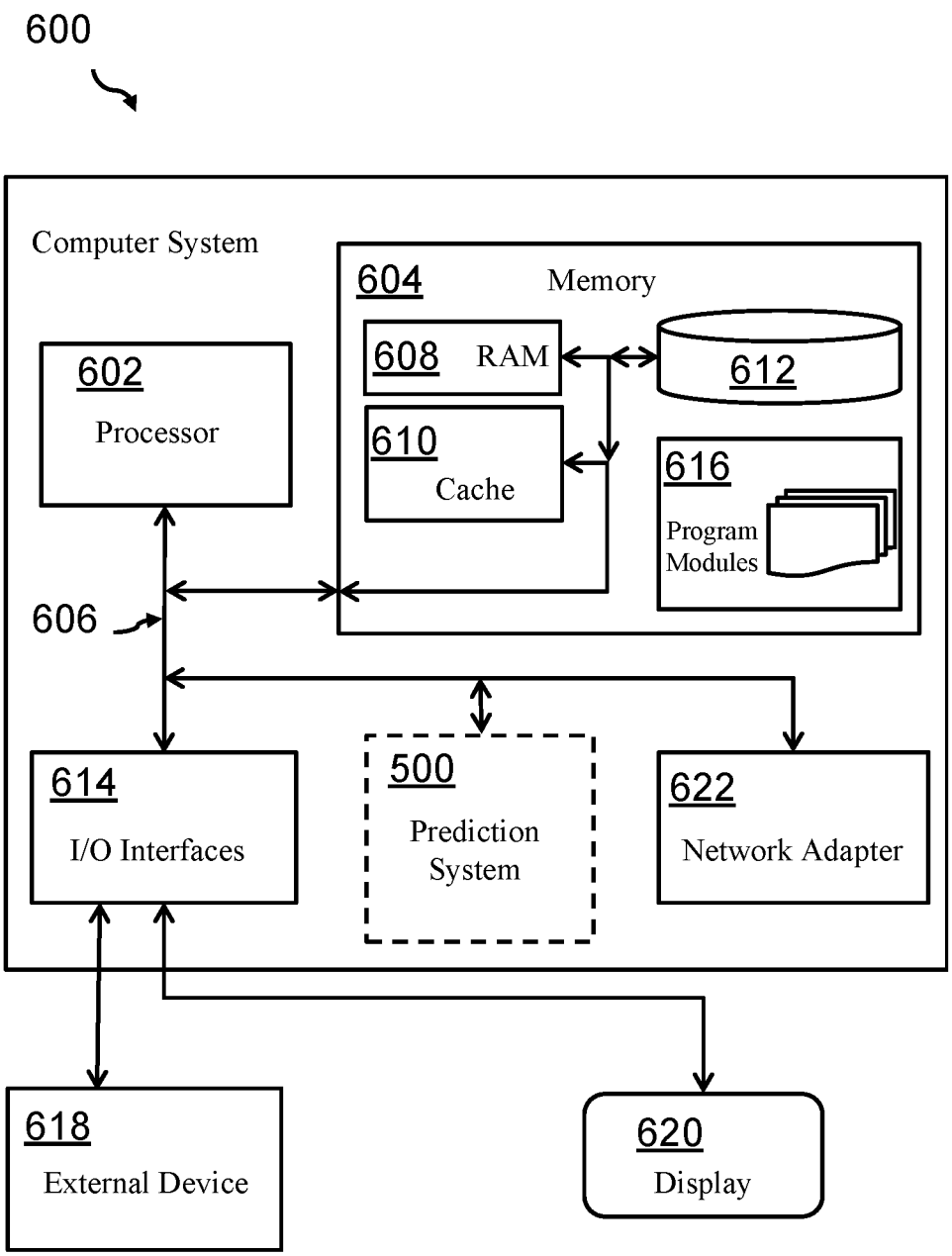
FIG. 6 shows an embodiment of a computing system comprising the prediction system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

Additionally, the prediction system 500 for event predictions based on objects in received data may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
   relating, in a knowledge graph, nodes of first objects with nodes of second objects and with nodes of object events, wherein the knowledge graph is structured into multiple hierarchical levels, at least one such level consisting of nodes for objects, and at least one such level consisting of nodes for object events;
   receiving input data, the input data comprising an input image;
   identifying a first object and a second object in the input image, the identified first object associated with a first node in the knowledge graph, the identified second object associated with a second node in the knowledge graph;
   ranking a set of object events based on probability using the knowledge graph, the probability based on a number of edges in the knowledge graph between each node corresponding to object events and the first and second node;
   predicting a first object event occurring within a time vicinity based on the ranking.

2. The method of claim 1, wherein the ranking is further based on edge weights associated with each edge.

3. The method of claim 1, further comprising, in response to predicting the first object event occurring within the time vicinity, triggering an action signal for an actuator.

4. The method of claim 3, wherein the actuator a influences movement of a portion of a robot, and wherein the action signal is configured to pre-position the portion of the robot in expectation of the first object event occurring.

5. The method of claim 1, wherein the identifying is performed by pattern detection or classification.

6. The method of claim 1, wherein the levels are differentiated by their respective value of conceptual abstraction.

7. The method of claim 1, wherein the input data further comprises sound data, the method further comprising:
   identifying a third object in the sound data, wherein the ranking is further based on the number of edges in the knowledge graph between each node corresponding to the object events and a third node associated with the third object.

8. A system comprising:
   a memory; and
   a processor in communication with the memory, the system configured to perform a method comprising:
   relating, in a knowledge graph, nodes of first objects with nodes of second objects and with nodes of object events, wherein the knowledge graph is structured into multiple hierarchical levels, at least one such level consisting of nodes for objects, and at least one such level consisting of nodes for object events;
   receiving input data, the input data comprising an input image;
   identifying a first object and a second object in the input image, the identified first object associated with a first node in the knowledge graph, the identified second object associated with a second node in the knowledge graph;
   ranking a set of object events based on probability using the knowledge graph, the probability based on a number of edges in the knowledge graph between each node corresponding to object events and the first and second node;
   predicting a first object event occurring within a time vicinity based on the ranking.

9. The system of claim 8, wherein the ranking is further based on edge weights associated with each edge.

10. The system of claim 8, wherein the method further comprises triggering an action signal for an actuator based on the predicting the first object event occurring within the time vicinity.

11. A computer program product comprising a computer readable storage medium having program instructions embodied therewith, the program instructions executable by one or more computing systems to cause the one or more computing systems to perform a method comprising:
    relating, in a knowledge graph, nodes of first objects with nodes of second objects and with nodes of object events, wherein the knowledge graph is structured into multiple hierarchical levels, at least one such level consisting of nodes for objects, and at least one such level consisting of nodes for object events;
    receiving input data, the input data comprising an input image;
    identifying a first object and a second object in the input image, the identified first object associated with a first node in the knowledge graph, the identified second object associated with a second node in the knowledge graph;
    ranking a set of object events based on probability using the knowledge graph, the probability based on a number of edges in the knowledge graph between each node corresponding to object events and the first and second node;
    predicting a first object event occurring within a time vicinity based on the ranking.

12. The computer program product of claim 11, wherein the ranking is further based on edge weights associated with each edge.

\* \* \* \* \*